(12) United States Patent
Hansen (10) Patent No.: US 9,016,344 B2
(45) Date of Patent: Apr. 28, 2015

(54) LAMINATOR TABLE

(76) Inventor: Jarle Hansen, Mysen (NO)

( * ) Notice: Subject to any disclaimer, the term of this patent is extended or adjusted under 35 U.S.C. 154(b) by 0 days.

(21) Appl. No.: 14/115,445

(22) PCT Filed: May 10, 2012

(86) PCT No.: PCT/NO2012/050086
§ 371 (c)(1),
(2), (4) Date: Nov. 4, 2013

(87) PCT Pub. No.: WO2012/154060
PCT Pub. Date: Nov. 15, 2012

(65) Prior Publication Data
US 2014/0076495 A1 Mar. 20, 2014

(30) Foreign Application Priority Data

May 10, 2011 (NO) .................................. 20110696

(51) Int. Cl.
*B32B 37/00* (2006.01)
*B29C 63/02* (2006.01)
*B32B 37/10* (2006.01)

(52) U.S. Cl.
CPC ........... *B32B 37/0053* (2013.01); *B29C 63/024* (2013.01); *B32B 37/10* (2013.01)

(58) Field of Classification Search
USPC .............. 156/285, 382, 555, 580, 582, 583.1, 156/510
See application file for complete search history.

(56) References Cited

U.S. PATENT DOCUMENTS

| | | | |
|---|---|---|---|
| 3,323,454 | A | 6/1967 | McFarland |
| 3,671,362 | A | 6/1972 | Pierce et al. |
| 6,827,803 | B1 * | 12/2004 | Willis ........................... 156/157 |

FOREIGN PATENT DOCUMENTS

| | | |
|---|---|---|
| EP | 0 986 459 B1 | 9/2004 |
| JP | 2004/017625 A | 1/2004 |
| NO | 315 014 B1 | 6/2003 |
| WO | WO-98/53987 A1 | 12/1998 |
| WO | WO-2012/010289 A1 | 1/2012 |

OTHER PUBLICATIONS

International Search Report for PCT/NO2012/050086, mailed Feb. 28, 2013; ISA/EP.

* cited by examiner

*Primary Examiner* — James Sells
(74) *Attorney, Agent, or Firm* — Harness, Dickey & Pierce, PLC (57) ABSTRACT

The present application provides a laminator table, wherein the table comprises a table top (8) with two opposite and parallel side edges (7), a horizontal guide rail (6) parallel to and at each of said side edges, and a roller (2) arranged above the table top, each horizontal guide rail (6) comprises a raising/lowering device (1) having a first and a second end, the first end connected to one of the two ends of the roller (2), the second end is connected to the horizontal guide rail (6), the raising/lowering device (1) is horizontally moveable along the guide rail (6) to which it is connected, wherein each raising/lowering device (1) comprises at least an attachment (4) for a wire (3), belt or chain, and that the raising/lowering devices (1) are connected via one or several wires (3,3'), belts or chains connected to said attachments (4) by a system of pulleys (5) or gears, wherein the pulleys (5) or gears are situated such that the wire (3,3'), belt or chain, at movement in a horizontal direction of a first raising/lowering device (1), will transfer force from said first raising/lowering device (1) to the second raising/lowering device and pull this second raising/lowering device in the same horizontal direction as the first.

8 Claims, 7 Drawing Sheets

Fig. 5 Detail 1

Fig. 6 Cross section A-A

Fig. 7 Cross section B-B

LAMINATOR TABLE

CROSS-REFERENCE TO RELATED APPLICATIONS

This application is a 371 U.S. National Stage of International Application No. PCT/NO2012/050086, filed May 10, 2012, and claims priority to Norwegian Patent Application No. 20110696, filed May 10, 2011, the disclosures of which are herein incorporated by reference in their entirety.

TECHNICAL FIELD

The present invention relates to a laminator table for the application of patterns and/or text to a flat surface.

BACKGROUND OF THE INVENTION

Current laminator tables are produced with a traverse, under which a roller, for moving over the work area, is mounted. The roller and the traverse are connected to raising/lowering devices on each side of the table. This traverse also serves as a counter for the pressure which the roller shall exert towards the workpiece. However, this traverse is obstructing the access to the workpieces and complicates many of the necessary work tasks. Said traverse is also an expensive/complicating element in the production of the laminator table itself. Such a traverse is primarily employed to achieve a rigid construction, wherein the roller maintains the parallelism when moved across the work area. Solutions for laminator tables without such a traverse have recently been described. Such solutions are applicable for laminator tables of restricted widths. However, at larger widths, and longer rollers, the increased torque which is exerted at the mounting of the roller will require a disproportionately large/powerful construction of the raising/lowering devices on each side of the table. The roller of current laminator tables has a fixed, penetrating shaft which is rotatably connected with the raising/lowering devices on each side of the table. The mounting of said shaft to the raising/lowering devices in an adequately stable manner is also contributing to necessitate a disproportionately large/powerful construction of said devices. Said fixed shaft will rotate when the roller is moved along the work area.

Another problem of the current solutions is to hold the workpieces, i.e. substrate, patterns etc. in place during the work process.

NO 315014 describes a laminator table which is representative for the known state of the art. The table comprises a roller which is mounted on a traverse which extends across the table. The traverse extends over the roller and will be in the way during many of the required work operations. The roller which is used has a continuous shaft which rotates during use, and the table has further no solution for holding the workpieces in place during the work process.

A laminator table, wherein the raising/lowering devices are not connected to an above-extending traverse, are produced by ModulmounterApS (www.modulmounter.dk). Said table is delivered with a width of up to 165 cm. The stability of the table is not known, but it must be assumed that torsional distortion of the roller will be a problem, especially at larger table widths/longer rollers.

Thus, from what is known in the art, a need exists for more stable solutions concerning the mounting, and/or movement/guiding, of the rollers of laminator tables.

SUMMARY OF THE INVENTION

The present invention provides solutions for achieving a more stable movement of a roller when it is moved along a laminator table.

The invention is further defined by the following:

In one embodiment the invention provides a laminator table, wherein the table comprises a table top having two opposite and parallel side edges, a horizontal guide rail parallel to, and at, each of said side edges, and a roller, each horizontal guide rail comprises a raising/lowering device having a first and a second end, the first end connected to one of the two ends of the roller, the second end is connected to the horizontal guide rail, the raising/lowering device is horizontally moveable along the guide rail to which it is connected, wherein each raising/lowering device comprises at least an attachment for a wire, belt or chain, and the raising/lowering devices are connected to each other, via one or several wires, belts or chains which are connected to said attachments, by a system of pulleys or gears, wherein the pulleys or gears are situated such that the wire, belt or chain, at movement in a horizontal direction of a first raising/lowering device, will transfer force from said first raising/lowering device to a second raising/lowering device and pull this second raising/lowering device in the same horizontal direction as the first.

The system of pulleys or gears may be constructed in a number of ways, both with and without shafts running transverse to the horizontal direction of the guide rails. The essential point is that the movement of one of the raising/lowering devices is transferred to the opposite raising/lowering device such that both achieve an identical displacement in the same horizontal direction. In this manner the roller will attain a completely parallel movement across the table top. Further solutions than those shown in the examples below will, based on the present application, be obvious to a skilled person.

In one embodiment, the system of pulleys or gears comprises at least one pulley, or gear, arranged close to each end of the guide rails. A wire, belt or chain, connected to a first raising/lowering device, is running horizontally in the same direction as the guide rail to which the first raising/lowering device is connected In yet another embodiment, the system of pulleys or gears comprises a shaft, the shaft mounted in a direction which is perpendicular to the horizontal direction of the guide rails, one wire, belt or chain is connected at each end of the shaft and said wire, belt or chain is connected to the attachment on one of the raising/lowering devices.

In one embodiment the invention provides a laminator table as described above, wherein the first end of the raising/lowering devices comprises a non-rotatable, or fixed, shaft end, and the roller is rotatably mounted at its ends in the shaft ends of two opposite raising/lowering devices.

In one embodiment the invention provides a laminator table as described above, wherein a system with a knife suitable for cutting transversally and/or longitudinally is mounted on one or more shaft ends or on a non-rotating roller shaft.

In one embodiment the invention provides a table as described above, wherein the table top comprises a transparent material.

In one embodiment the invention provides a table as described above, wherein the table comprises at least one light source situated below the table top.

In one embodiment the invention provides a table as described above, wherein the table top comprises an optional number of holes or slits, the table top constitutes an upper surface of a layer/enclosed space from which air can be withdrawn by use of a vacuum pump in contact with said layer/enclosed space.

DETAILED DESCRIPTION OF THE INVENTION

The purpose of the present invention is to provide solutions which ensures a stable and smooth movement of the roller across the table top of a laminator table.

Figure 1:
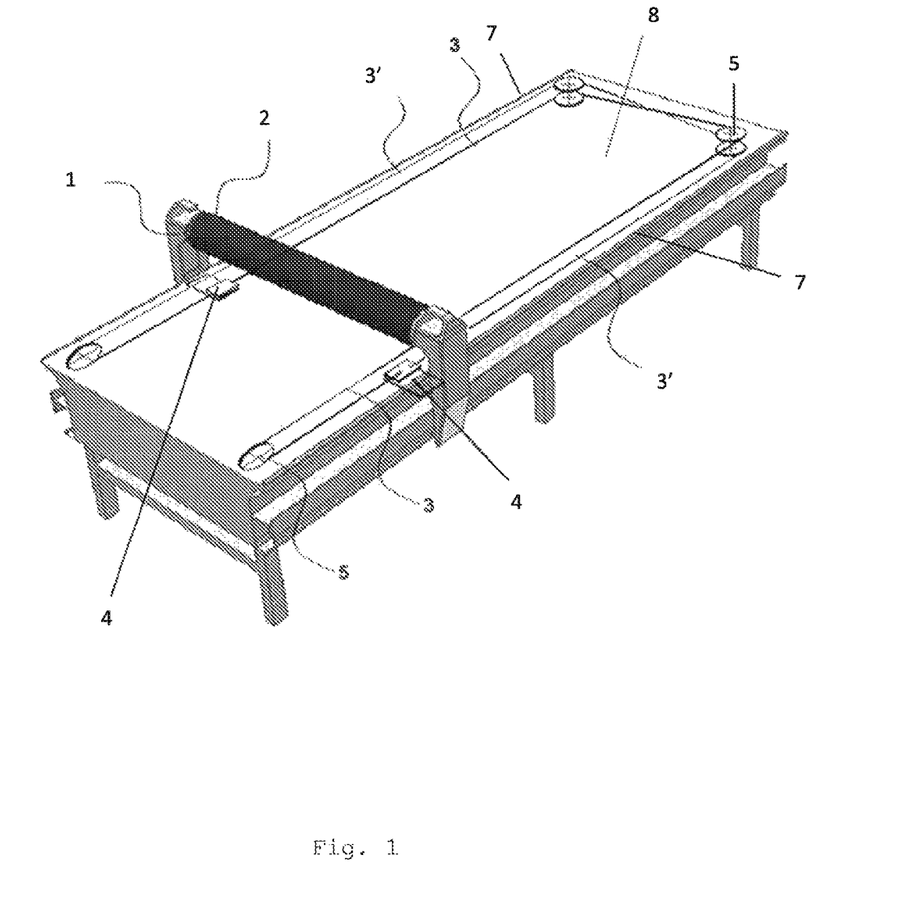
FIG. 1 shows an isometric drawing of an embodiment of a laminator table according to the present invention.

One such solution is shown in FIG. 1. The table has horizontal guiding rails 6 which run parallel to the longitudinal sides 7 of the table top 8. To these guide rails 6, raising/lowering devices 1 are mounted; said devices may be moved horizontally along the parallel guide rails 6. A roller 2 is mounted at its ends in between the two raising/lowering devices 1. To achieve an accurate parallel movement of the two ends of the roller, the two raising/lowering devices 1 are connected together by use of a wire/pulley-system 3,5. One end of the wire 3 is connected to an attachment 4 on a first raising/lowering device, and the second end of the wire is, via three pulleys 5, connected to an attachment 4 on the second raising/lowering device. The attachments 4 may, for instance, run free in a slot/gap situated above or below the guide rails. Horizontal movements of the first, or the second, raising/lowering device will in this manner result in a corresponding movement of the opposite raising/lowering device in the same direction due to the force transferred from the wire.

Although the solution in FIG. 1 is shown with a wire/pulley-system, this effect may equally well be attained by using similar combinations to achieve the desired power transfer, such as a belt/pulley, chain/gears etc.

Figure 2:
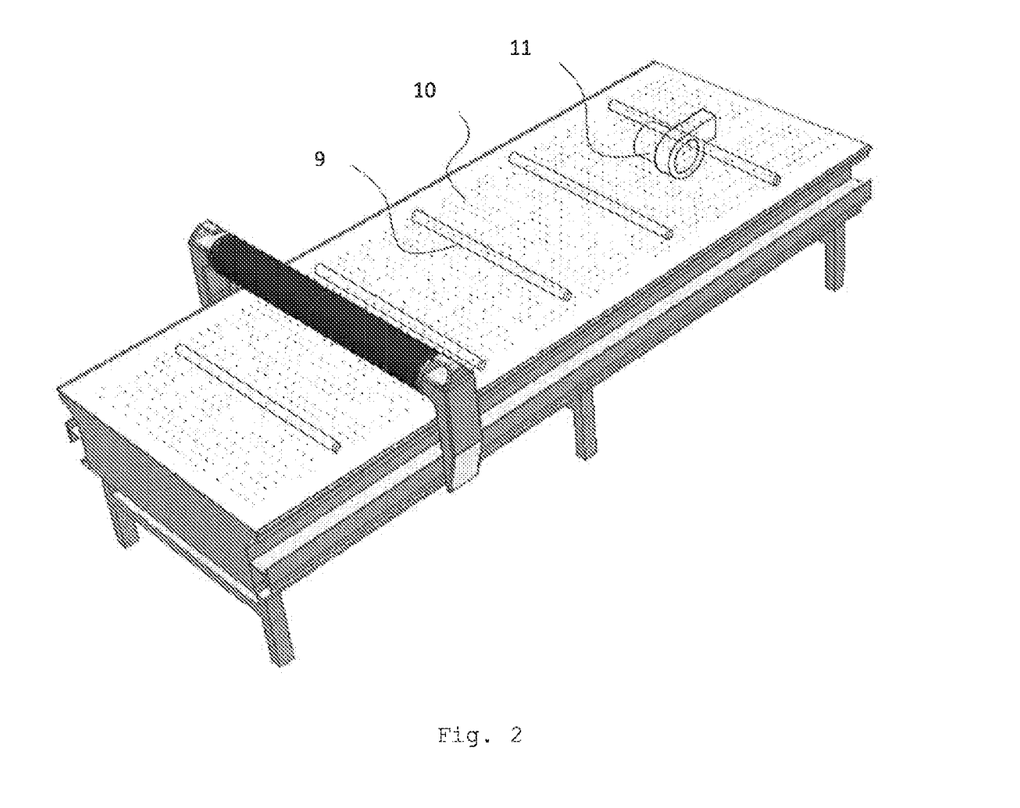
FIG. 2 shows an isometric drawing of a laminator table with a vacuum system.
Figure 9:
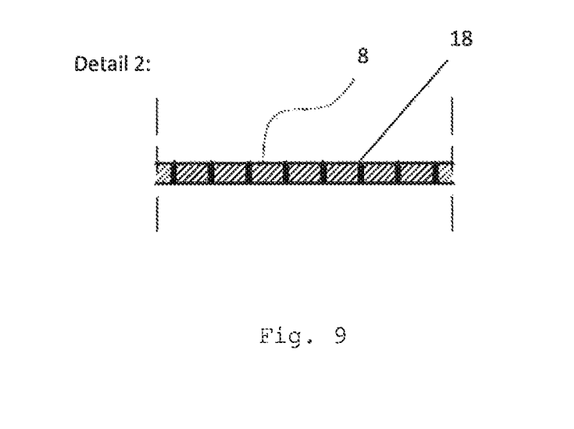
FIG. 9 shows a detail of the table top of the table shown in FIG. 2.

FIG. 2 shows a solution for achieving adhesion of workpieces to the table top 10. The table top has a number of perforations/holes and constitutes one side of a layer or cavity which is connected to a vacuum pump 11. The vacuum pump 11 makes sure that the work pieces are held in place at the table top due to the sub-atmospheric pressure which is created beneath the workpieces. A cross section of a table top 8 with perforations 18 is shown in FIG. 9. Also, the table has light sources 9 which make sure that the work pieces are illuminated from beneath.

Figure 3:
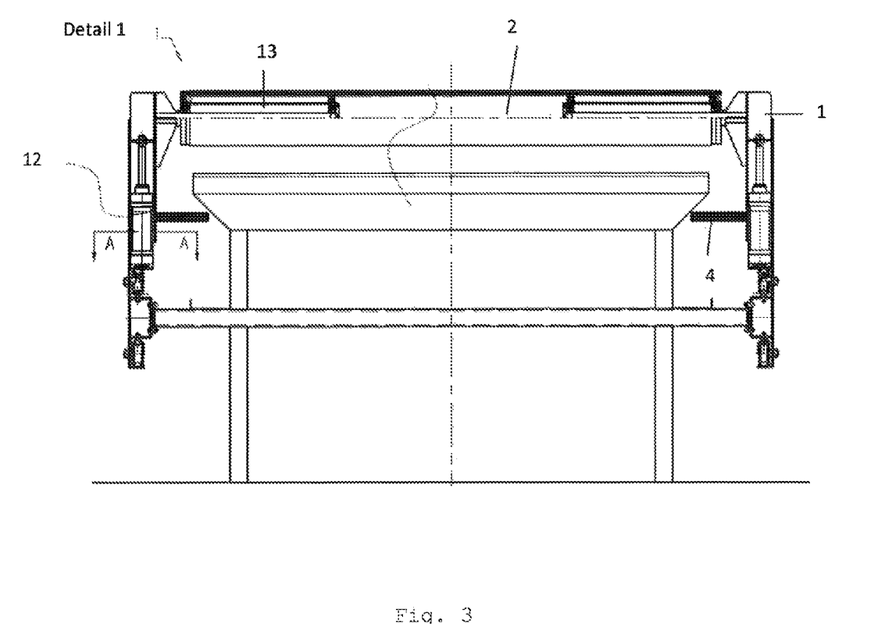
FIG. 3 shows a cross-section of the table shown in FIG. 2.
Figure 6:
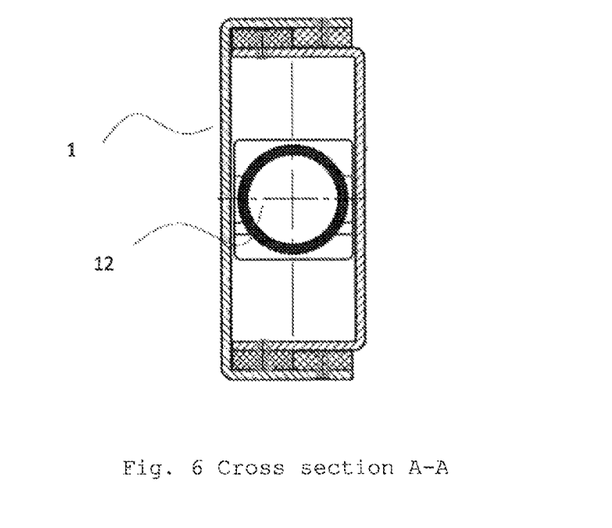
FIG. 6 shows a cross-section of the raising/lowering device of the table shown in FIG. 2.

FIG. 3 shows a solution which also may contribute to a more stable and even movement of the roller over the table top on a laminator table. A cross-section of a table with such a solution is shown here. The table has raising/lowering devices 1, wherein the vertical raising/lowering movement is achieved by means of hydraulic air cylinders 12. A horizontal cross section of a raising/lowering device with hydraulic air cylinder is shown in FIG. 6. Each of the raising/lowering devices has a fixed, non-rotatable shaft end 13, to which one end of the roller is connected. By having a fixed shaft end mounted on the raising/lowering devices, a higher stability than in solutions wherein the shaft ends are a fixed part of the roller is achieved. This solution may advantageously be combined with a power-transfer system as discussed in connection with FIG. 1 or 11, by attaching wires to the attachment 4, but said solution is not essential in order to achieve adequate stability.

Figure 4:
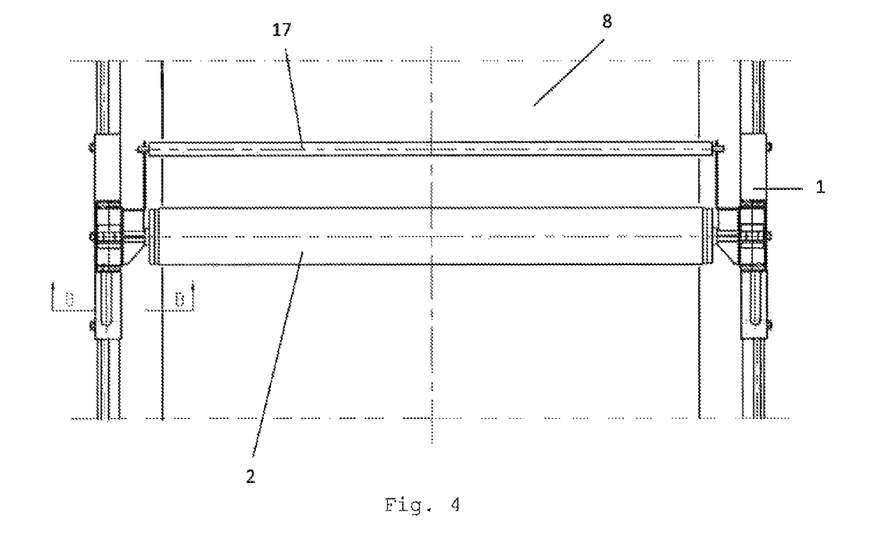
FIG. 4 shows the table in FIG. 2 from above, fitted with a pre-mask holder.
Figure 5:
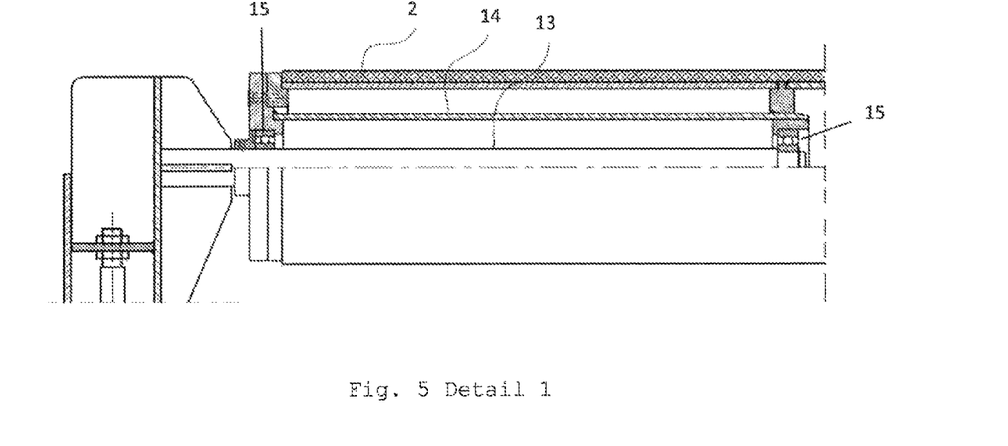
FIG. 5 shows a detail of the roller and raising/lowering device of the table shown in FIG. 2.
Figure 7:
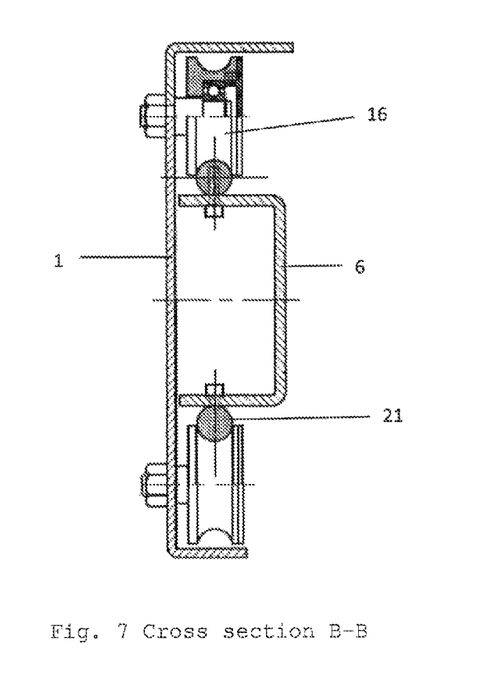
FIG. 7 shows a cross-section of the horizontal guide rails of the table shown in FIG. 2.
Figure 8:
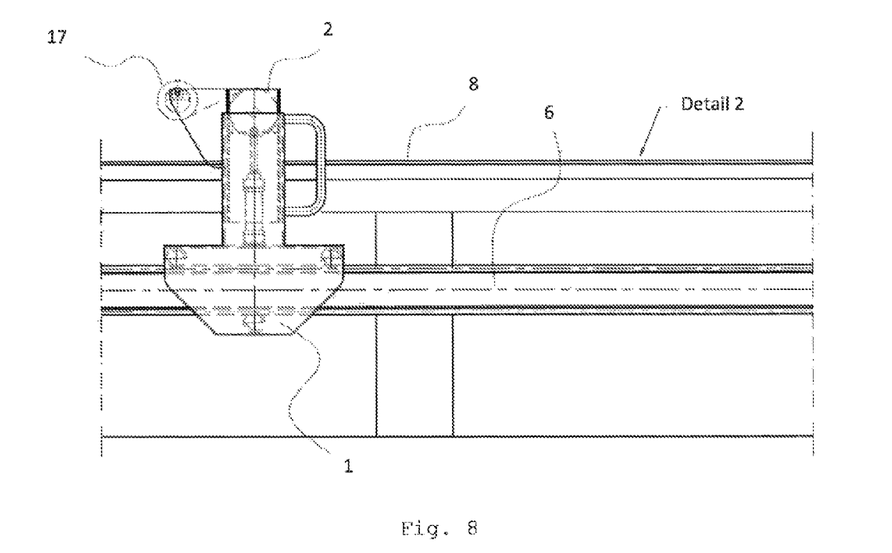
FIG. 8 shows the table with the raising/lowering device shown in FIG. 2 from the longitudinal side.

FIG. 4 shows the table in FIG. 3, from above. A pre-mask holder 17 is mounted between the raising/lowering devices 1. In FIG. 5, the mounting of one end of the roller 2 is shown. The end of the roller has a bearing house 14, wherein the fixed shaft end 13 of the raising/lowering device 1 fits. The roller rotates around the shaft end by means of ball bearings 15. FIG. 7 shows a vertical cross section of the mounting of a raising/lowering device to a horizontal guide rail which run parallel with one of the longitudinal sides of the table. The horizontal movement of the raising/lowering device 1 is achieved by wheels 16, mounted on the raising/lowering device, which runs on the rail 21 mounted on the guide rail 6. In FIG. 8, the raising/lowering device 1 is shown from the side.

Figure 10:
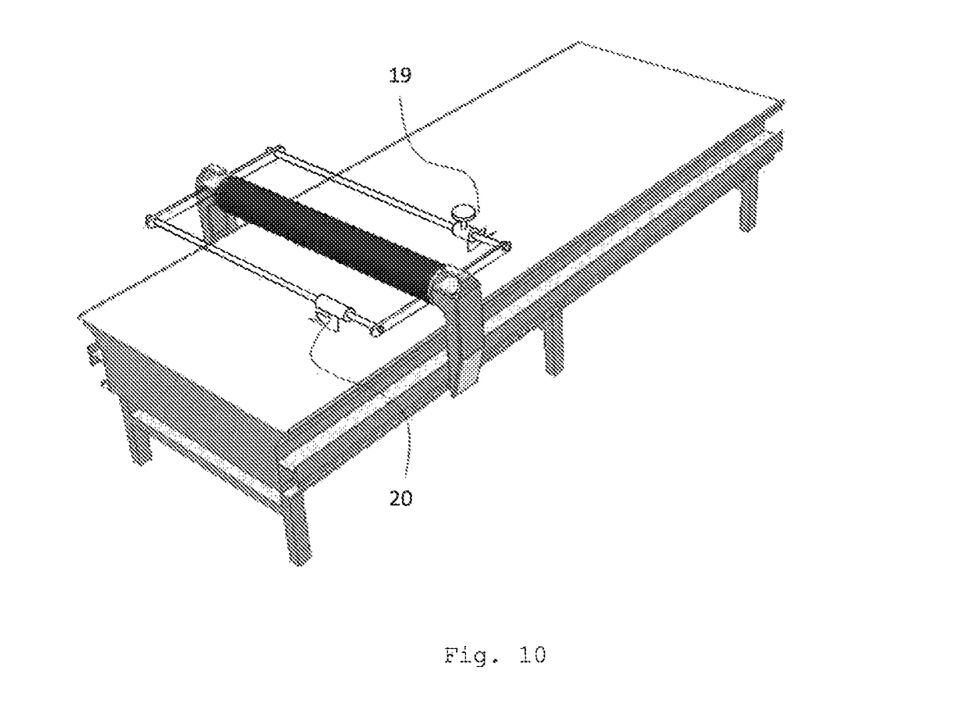
FIG. 10 shows the table shown in FIG. 2 with knives mounted thereto.

A further advantage by having fixed, non-rotatable, shaft ends 13 mounted on, or as a part of, the raising/lowering devices is that equipment may be attached to these. Said equipment may be raised from and lowered towards the table top, and the workpieces which is situated on said top. A system with knives 19,20 for cutting workpieces, both transverse and along the longitudinal direction, is shown in FIG. 10. Equipment, as described herein, may also be attached to the shaft of the roller, when said shaft does not rotate in relation to the raising/lowering devices.

Figure 11:
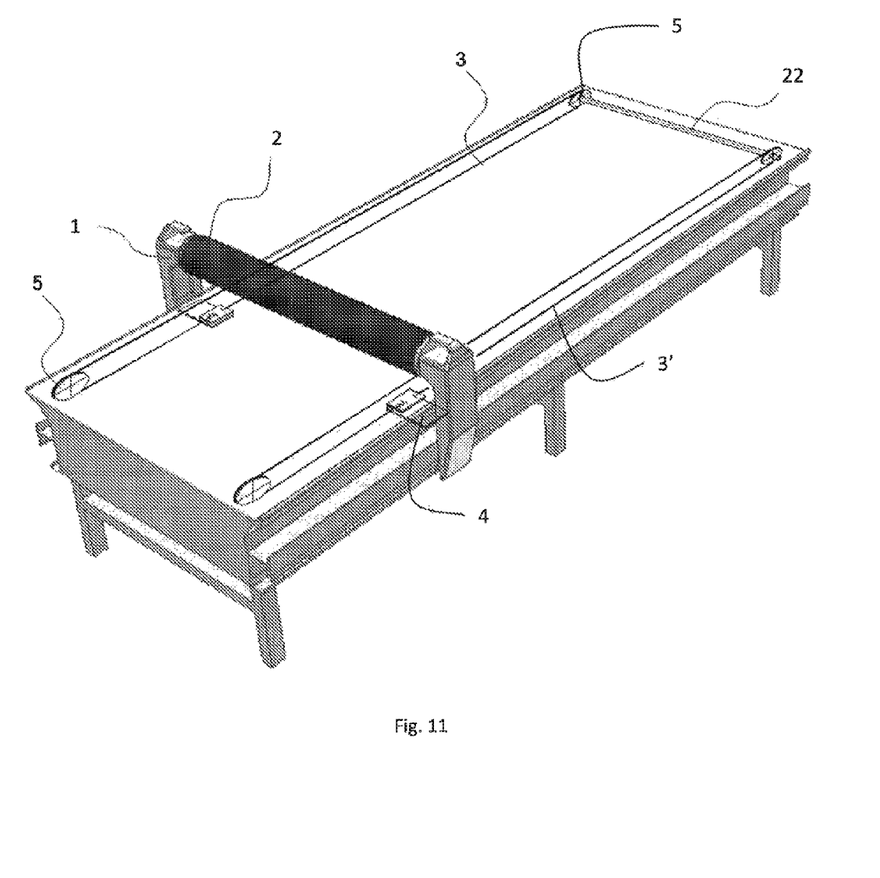
FIG. 11 shows an isometric drawing of an alternative embodiment of a laminator table according to the present invention.

An example of an alternative embodiment of a laminating table according to the invention is shown in FIG. 11. Here, the horizontal movement of one of the raising/lowering devices 1 is transferred to a wire 3 which is connected to the attachment 4 in said raising/lowering device. The wire 3 is further connected to a shaft 22 which in turn transfers the movement to the second raising/lowering device via a further wire 3'. Pulleys, mounted on the opposite side of the raising/lowering devices in relation to the shaft 22, make sure that the direction of the transferred movement is correct, i.e. both raising/lowering devices are moved in the same horizontal direction.

To better understand the utility of the solutions described above, it is further described a method for doing laminating work with a table as described above.

When laminating work is to be performed, the work pieces are put in layers on the work top, table top 8. If the work pieces are not connected together, and they have to be placed up to and against each other in a certain pattern, it is advantageous to have a vacuum in the table top to avoid having to tape and fix the pieces to the table, until a pre-mask is applied, in order to hold the pieces in position. When the pieces are placed correctly, and kept fixed to the table with vacuum, a pre-mask is placed above the whole of the work pieces. The linearly moveable roller 2 is led over the work piece and lowered down on the middle of the work piece. When said roller is moved linearly to one side, it will push out all air being between the details and the pre-mask such that the pre-mask is placed accurately against the details. The same is repeated on the other half. The vacuum is turned off and the whole assembled work piece may be lifted away as a united piece. Now, the surface to which the assembled pieces are to be attached is put on the table. It may be a steel plate, glass, non-decorated poster etc. Above this surface the previously assembled work piece is now put in a correct position. The roller is once more led into position over the middle of the workpiece and lowered. Now one half of the workpiece is lifted over the roller and in on the opposite side. The paper which protects the glue on the assembled pieces is removed and cut off close to the roller. The part that was lifted over on the opposite side is now held in a suitable position and is following along when the roller is moved over half of the workpiece. The assembled part is now glued to the surface without air bubbles or creases underneath. The same operation is now repeated on the other half. The roller is then moved away from the workpiece and the surface remains with its intended decoration or text glued on.

The invention claimed is:

1. A laminator table, wherein the table comprises a table top with two opposite and parallel side edges, a horizontal guide rail being parallel to and placed at each of said side edges, and a roller arranged above the table top, each horizontal guide rail being connected to a raising/lowering device having a first and a second end, the first end connected to one of the two ends of the roller, the second end is connected to the horizontal guide rail, the raising/lowering device is horizontally moveable along the guide rail to which it is connected and vertically moveable relative to the table top providing for the roller to move horizontally and vertically, respectively, relative to the table top;

wherein each raising/lowering device comprises at least an attachment for a wire, a belt or a chain, and that the raising/lowering devices are connected via one or several wires, belts or chains connected to said attachments by a system of pulleys or gears, wherein the pulleys or gears are situated such that the wire, belt or chain, at movement in a horizontal direction of a first raising/lowering device, will transfer force from said first raising/lowering device to a second raising/lowering device and pull this second raising/lowering device in the same horizontal direction as the first.

2. The laminator table according to claim 1, wherein the system of pulleys or gears comprises at least one pulley or gear, arranged close to each end of the guide rails.

3. The laminator table according to claim 1, wherein the system of pulleys or gears comprises a shaft, the shaft being mounted in a direction which is perpendicular to the horizontal direction of the guide rails, and the shaft being at each of its ends connected to a wire, belt or chain and said wire, belt or chain is connected to the attachment on one of the raising/lowering devices.

4. The laminator table according to claim 1, wherein the first end of the raising/lowering devices comprises a non-rotatable, or fixed, shaft end, and the roller is rotatably mounted at its ends in the shaft ends of two opposite raising/lowering devices.

5. The laminator table according to claim 1, wherein a system with a knife for transvers cut and/or longitudinal cut is mounted on one or more fixed shaft ends, or on a non-rotating roller shaft.

6. The table according to claim 1, wherein the table top comprises a transparent material.

7. The table according to claim 6, wherein the table comprises at least one light source situated below the table top.

8. The table according to claim 1, wherein the table top comprises an optional number of holes or slits, the table top constitutes an upper surface of a layer/enclosed space from which air can be withdrawn by use of a vacuum pump in contact with said layer/enclosed space.

\* \* \* \* \*